Feb. 1, 1955  E. H. WALLACE  2,700,998
PNEUMATIC TIRE AND METHOD OF MAKING SAME
Filed June 14, 1951  3 Sheets-Sheet 1
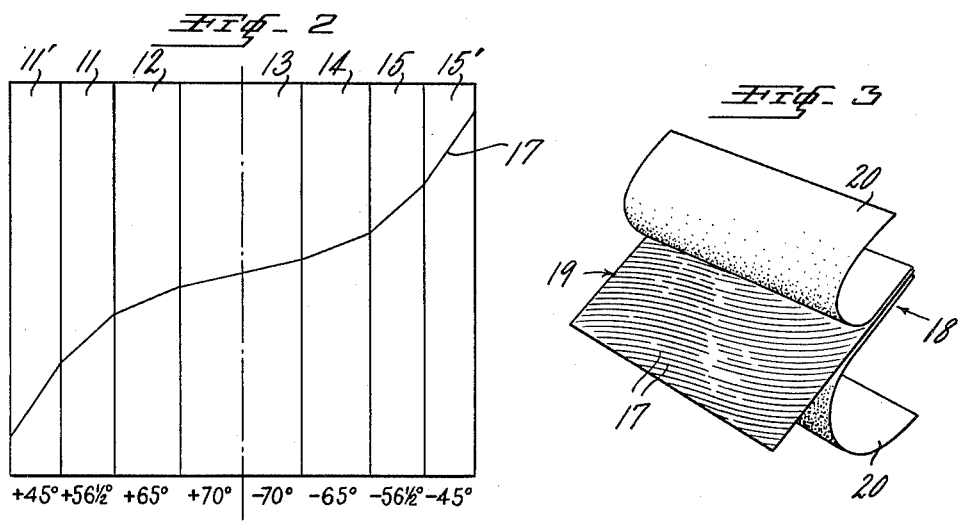
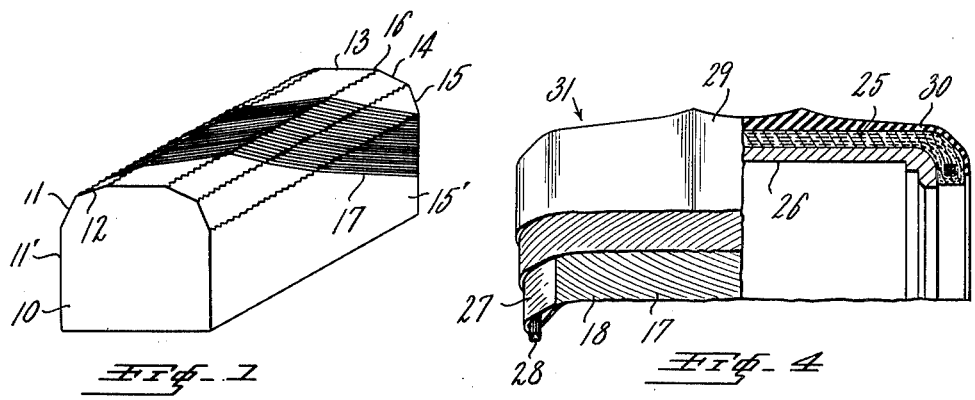
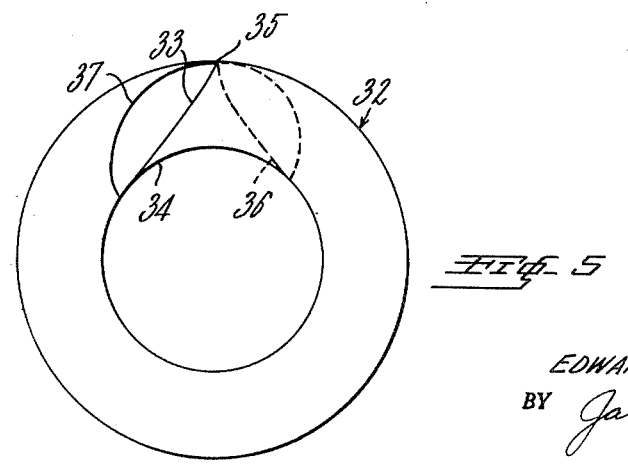
INVENTOR.
EDWARD H. WALLACE
BY James J. Long
AGENT

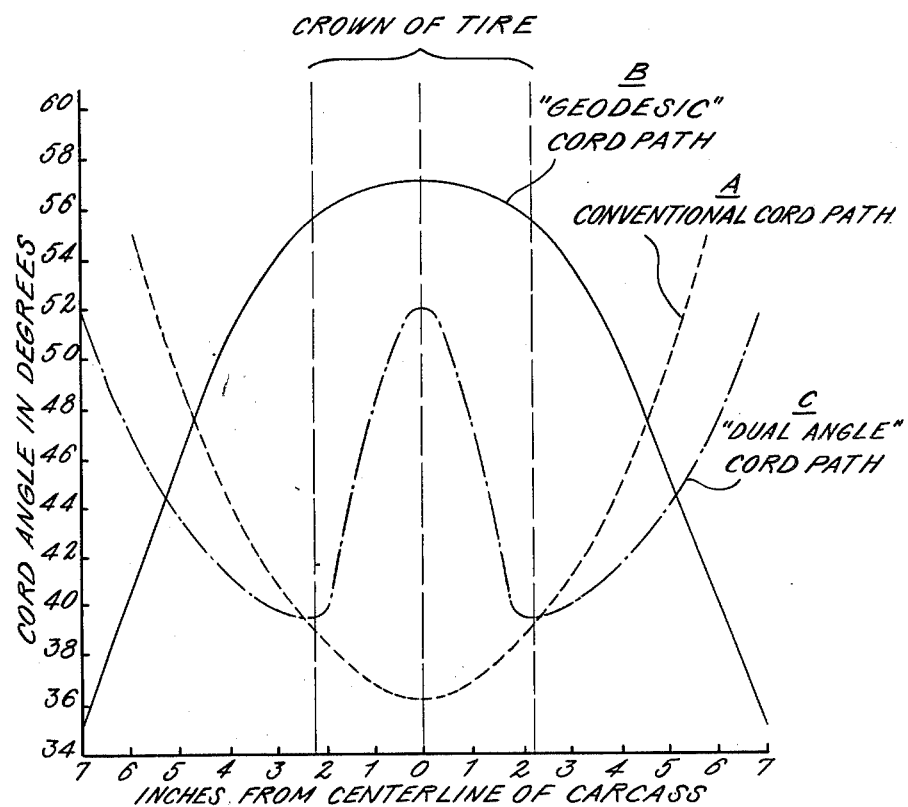

Feb. 1, 1955 E. H. WALLACE 2,700,998
PNEUMATIC TIRE AND METHOD OF MAKING SAME
Filed June 14, 1951 3 Sheets-Sheet 3
Fig. 7
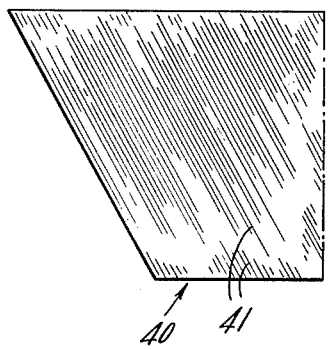
Fig. 11
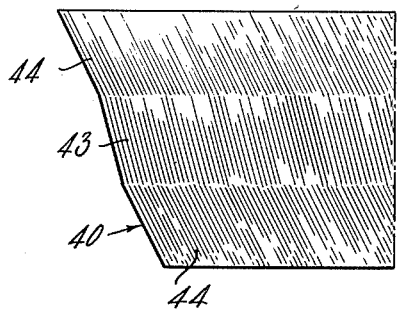
Fig. 8
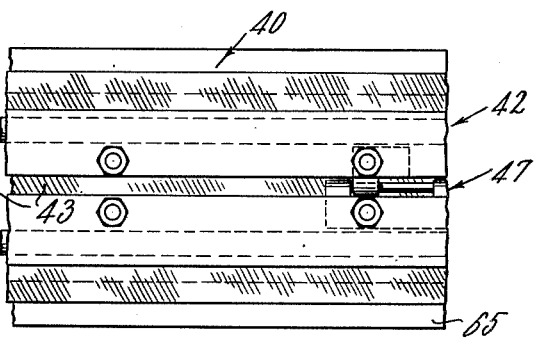
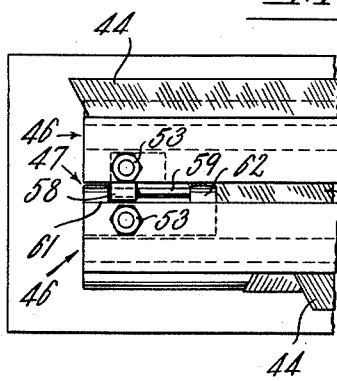
Fig. 9
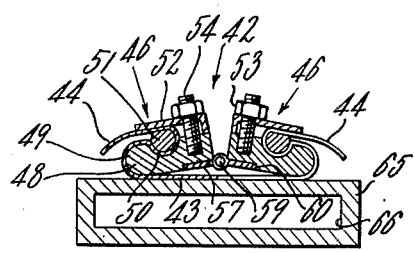
Fig. 10
INVENTOR.
EDWARD H. WALLACE
BY James J. Long
AGENT

2,700,998

PNEUMATIC TIRE AND METHOD OF MAKING SAME

Edward H. Wallace, Detroit, Mich., assignor to United States Rubber Company, New York, N. Y., a corporation of New Jersey Application June 14, 1951, Serial No. 231,569

12 Claims. (Cl. 152—356)

This invention relates to an improved pneumatic tire fabric and an improved pneumatic tire, embodying stranded carcass reinforcing elements disposed in a unique manner, and to a method of making such fabric and tire.

One object of the invention is to provide a pneumatic tire fabric having cords or similar stranded reinforcing elements arranged in a path designed to produce the most favorable properties in the tire.

Another object is the provision of a pneumatic tire having improved riding characteristics, such as ease and stability of steering and smoothness of ride.

Still another object is to provide a pneumatic tire capable of increased cushioning ability at standard inflations, i, e., increased deflection for a given force applied thereto.

A further object of the invention is to provide a pneumatic tire having enhanced rupture resistance, as well as greater resistance to cracking at the bases of the tread grooves.

Still a further object of the invention is the provision of a pneumatic tire utilizing a smaller quantity of reinforcing material in the carcass than has heretofore been considered essential.

It is also an object of the invention to provide a method of making a pneumatic tire which provides for arranging the carcass cords or other reinforcement at the optimum angle at various portions of the tire.

It is also an object of the invention to provide a method of making tires which permits desirable variation in the angle at which the stranded carcass reinforcing elements pass through the tire.

The manner in which the invention accomplishes the foregoing objects, as well as additional objects and advantages, will be manifest in the following detailed description of the invention which is intended to be read with reference to the accompanying drawings, wherein Fig. 1 is a perspective view of a form or jig on which tire cords have been laid as a first step in one method of carrying out the invention;

Fig. 2 is a diagram showing the path of a single cord as removed from the jig in Fig. 1 and transferred to a plane surface;

Fig. 3 is a perspective view of a portion of tire fabric assembled according to the invention and having skim coatings of rubber carcass stock applied thereto;

Fig. 4 is a fragmentary elevational view, with parts in section and parts broken away, of a tire carcass assembled on a tire building drum in accordance with the invention;

Fig. 5 is a diagrammatic side elevation of a completed tire;

Fig. 6 is a graph showing the variation in cord angle of a conventional tire and tires made in accordance with the invention;

Fig. 7 is a plan view of a portion of conventional tire fabric;

Fig. 8 is a plan view of a shifting jig for changing the cord angle of a conventional fabric;

Fig. 9 is a fragmentary plan view of the jig of Fig. 8 in a shifted position;

Fig. 10 is a transverse sectional elevational view of the jig taken along line 10—10 of Fig. 9; and Fig. 11 is a plan view of a portion of tire fabric having the cord angle therein varied in accordance with the invention.

The invention contemplates the provision of a tire in which the stranded reinforcing elements of the carcass are disposed on a cord path having a generally increased angle toward the center or crown of the tire. In the preferred form of the invention the carcass reinforcing elements have their minimum angle toward the beads or rims of the tire and a maximum angle at the crown of the tire. Such a tire may be constructed by providing bias tire fabric, that is, the usual bias cord fabric thinly coated upon each side with conventional vulcanizable rubber carcass stock, but having the cords or other stranded elements running across the fabric at a predetermined varying angle, in place of at a constant angle as in conventional tire fabric. In other words, the present tire fabric is what may be termed multiple angle fabric in contrast to conventional tire fabric in which the cords initially have but a single angle throughout their length. Specifically, the improved bias tire fabric has over its central region, that is, over the region corresponding to the crown of the tire, a relatively higher angle than it has toward either of its marginal edges. A plurality of layers or plies of such multiple angle fabric are assembled, as on a tire building drum, with the marginal edges of the plies overlapping inextensible wire bead assemblies, to form a tire carcass in the form of a flat band, and after superimposing a rubber tread and sidewall on the carcass, the assembly may be shaped and vulcanized in annular toroidal form in the usual manner.

In the most preferred form of the invention, the cord is disposed in the flat tire fabric along a generally S shaped path in which the angle varies in such manner that in the finally shaped carcass the cord follows what might be termed a geodesic path, that is a path of minimum length along the curved surface of the tire carcass. In a tire having reinforcing cords running in a bias in a true geodesic path, the cord angle is at a maximum at the center line of the crown of the tire and decreasing uniformly toward each bead of the tire. In practice it is satisfactory and more convenient to approximate the geodesic path by providing an angle of approximately 45° to 55° as a maximum at the crown of the tire and an angle of approximately 30° to 40° as a minimum at the bead, with a gradation of angles in between these regions. Fabric in which the cord angle in the flat is from 37° to 47° at the marginal edges of the ply and increases progressively to 65° to 72° at the central zone of the ply will generally provide the foregoing cord path in the finished tire.

Referring to the drawings, and in particular to Fig. 1, one manner of preparing the improved tire fabric to be used in making a tire carcass according to the invention contemplates providing a suitable block or jig 10, having an arched or crowned upper surface. The curved surface is divided into a plurality of segments, in this case five segments, 11, 12, 13, 14 and 15, while upright side faces 11′ and 15′ of the jig 10 serve as additional segments, providing a total of 7 angularly disposed surfaces at the crown of the jig. Along the marginal edges of the segments there are provided relatively fine serrations or teeth 16 to serve as a guide in laying a tire cord on the form. A continuous length 17 of the reinforcing material from which it is desired to make the tire carcass (e. g., yarns or cord made from cotton, rayon, nylon, etc., or wire cable) is then wound around the form 10 utilizing the serrations 16 as a guide in placing the cord 17 or the like at a desired angle in each of the segments 11′ and 15′. The variation in the cord angle as the cord passes across the crown of the form 10 results in a generally S shaped path intended to approach a geodesic path in the tire. Fig. 2 indicates the angle the cord is laid on the form in the various segments, which is the same angle in each segment after the fabric is removed from the form and laid flat. The cord angle at the central segment 13 is the highest angle, in this case 70°, while the angle at the adjacent segments 12 and 14 is somewhat decreased, in an opposite sense in each of the segments, to 65°. It will be understood that the cord angle is conventionally designated as the angle the cord makes with the centerline of the crown of the tire at a specified distance from the centerline. This definition is recognized in the trade although strictly speaking the cord is constantly changing angle and the reference is the angle the cord is tangent to at the specified point. The cord in the next outer segments 11 and 15 has a lower angle again, vis., 56½°, while the cord at the sides 11' and 15' of the form is laid at a minimum angle, viz., 45°. Successive turns of the cord are laid parallel to each other thereby forming a cord fabric, and this process is continued until there is obtained a length of cord fabric at least sufficient to make up one ply of the tire carcass.

The cord may be treated before laying on the form with the usual latex-resin solution to improve the adhesion to subsequently applied rubber. A thin calendered layer of vulcanizable rubber carcass stock may then be laid on top of the cords on the form and united to the cords, preferably with the aid of a previously applied layer of rubber cement, by pressing the rubber firmly against the form over its entire area. The width of the layer of rubber will be at least the width of the desired tire ply, allowing sufficient excess at each side to provide for ply lock-ups around the beads of the tire. The excess portion of the cords passing around the underside of the form may be cut off, whereupon the cord fabric, with the cords maintained in their proper relative position by the superimposed rubber layer, is laid flat on a suitable working surface with the bare surface of the cords facing upwardly, and a second thin layer of vulcanizable rubber carcass stock is applied to the bare surface of the fabric. There is thus produced a laminated tire fabric 18, as shown in Fig. 3, having a layer of cord 17 disposed on a bias along a generally S shaped path to form a cord fabric 19, skim coated on each side with a layer of vulcanizable rubber carcass stock 20.

Instead of building up the cord on the form 10 by winding a continuous length of cord repeatedly around the form, it is frequently more convenient to take a portion of conventional bias cut fabric which has been solutioned with the usual resin-latex mixture, but has not yet been calendered, and lay such fabric on the form as a unit. Such fabric may be clamped along its marginal edges by a suitable clamp (not shown) to insure even tension as it is applied to the form, and it is applied to the form with a progressive shifting of the cords, utilizing the serration 16 as a guide, to provide the desired angle at each of the segments of the form. The layers of rubber carcass stock are then applied to the cord fabric as previously described.

Having thus provided a multiple angle tire fabric 18, a tire carcass 25 (Fig. 4) is built up by superimposing a plurality of layers of such fabric on the working surface of a collapsible tire building drum 26. The marginal edges 27 of the plies are overlapped around inextensible wire bead assemblies 28 to anchor the plies firmly in their proper operating position. It should be noted that the tire cord 17, in place of passing from one bead of the tire to another on a bias in an essentially straight path of constant angle as in conventional practice, passes on a bias along a path of continually changing angle. The plies are superimposed in such manner that the cords in alternate layers run in opposite directions. An extruded vulcanizable rubber tread 29 and sidewall portion 30 is superimposed on the carcass to form the completed tire casing 31 in the form of an essentially flat band, which may be removed by collapsing the drum 26.

The tire casing 31 is then shaped into annular toroidal form with the aid of the usual vacuum shaping box (not shown) wherein a curing bag (not shown) is inserted in the tire. The assembly of tire and curing bag is then placed in the usual mold (not shown), wherein the tire is vulcanized in final shape under the influence of heat and pressure. Alternatively, the flat tire band 31 may be shaped and vulcanized in that type of vulcanizing mold having an integral curing bag and adapted to shape the tire band into toroidal form as the band is enclosed in the mold.

The vulcanized tire 32 has the general form shown in Fig. 5 and is characterized by the fact that the cords follow a unique path in the carcass by reason of the special multiple angle cord fabric employed. The general form of the cord path in the tire 32 is indicated by the line 33 in Fig. 5, which is shown as a solid line in the half of the tire facing the observer, and shown dotted in the half of the tire away from the observer. It will be evident from an inspection from Fig. 5 that the cord angle is unusually low at the bead region 34 of the tire, and gradually increases to an unusually high value at the crown 35 of the tire, and thereafter decreases again in an opposite sense to a minimum value at the opposite bead 36 on the opposite side of the tire. The improved cord path 33 is contrasted to the conventional cord path 37 of the type which necessarily results in the finally shaped tire when bias cord fabric having straight or single angle cords is employed. In such a conventional cord path the angle of the cord at the crown region is at a minimum, and the cord angle increases toward each bead of the tire.

The contrast between the conventional cord path and the cord path in the improved tire is brought out graphically in Fig. 6, wherein the cord angle in degrees is plotted on a vertical axis against inches measured from the crown central line of the tire carcass plotted on the horizontal axis. The curves shown in Fig. 6 were prepared by measuring the actual cord angle at various distances from the crown central line in a conventional tire and in tires made according to the invention. The conventional cord path is represented by the dotted line A. This has its minimum angle at the crown of the tire, and increases with increasing distance from the crown, to a maximum value at the bead. In the improved tire the cord follows the so-called geodesic path B having a maximum angle at the centerline of the carcass, and decreasing progressively to a minimum angle at each bead.

The curve C in Fig. 6 represents a simplified form of the invention in which the benefits of the invention are realized in large measure by providing a high cord angle at the crown of the tire. The modification of the invention represented by curve C will now be described in detail.

In this modification of the invention there is provided a tire fabric in which the cord angle, in place of changing progressively from one side of the fabric to the other, is merely increased at a central zone of the fabric, while the cord angle of the two edge zones of the fabric is left essentially undisturbed. This may be accomplished by first providing a layer of bias cut tire fabric 40 of suitable length and width composed of cord fabric lightly coated on each side with the usual vulcanizable rubber stock. In the fabric 40 the cords 41 run across the fabric on a bias at a constant angle from one side to the other.

For the purpose of increasing the cord angle of the central zone of the fabric 40, there is provided a shifting jig 42 in which the fabric is clamped and a central zone 43 of the fabric is shifted with respect to the marginal zones 44 at each edge of the fabric. The shifting jig includes two longitudinal clamping members 46 joined at the center by hinges with removable pins 47 located at spaced intervals along the assembly. Each clamping member 46, as best indicated in Fig. 10, is composed of a lower longitudinal block 48 curved at its outer edge 49 and having in its upper surface a semi-circular recess 50 extending the length of the block 48. A cooperating longitudinal bar 51 rounded on its undersurface and flattened on its upper surface fits into the recess 51 and is engaged on its flat upper surface by a retaining plate 52, detachably secured in place by nuts 53 on threaded lugs 54 that pass freely through holes in the bar 52 and that are threaded into the block 48, thus providing a clamping means which securely holds skim coated fabric against slippage without damaging either the fabric or the skim coat. The fabric 40 is disposed in the jig 42 with the central zone 43 to be shifted extending along the bottom of the jig and around the curved side 49 of each block 48 to the recess 50. In the recess 50 the fabric is held firmly in place by the undersurface of the curved bar 51, which is, in turn, held in place by the clamping plate 52. Each of the marginal edge zones 44 of the fabric passes around the inner side of the bar 51 and then passes outwardly again between the flattened upper surface of the bar and the undersurface of the plate 52, and extends freely from the side of the jig.

Each sliding hinge arrangement 47 is composed of a hinge plate 57 attached to the lower face of one of the blocks 48 and having a single lug 58 (Figs. 8 and 9) projecting toward the center of the assembly for slidably receiving a hinge pin 59. A cooperating hinge plate 60 attached to the undersurface of the remaining block carries two spaced lugs 61 and 62 (Figs. 8 and 9) located at each end of the hinge plate 60 and rigidly secured to the hinge pin 59. When the jig is in the initial unshifted position, as shown in Fig. 8, the lug 61 on the end of the hinge plate 60 engages the central lug 58 on the opposite hinge plate 57. To product the desired change in cord angle of the central zone 43 of the fabric 40, the longitudinal clamping members 46 of the jig 42 are shifted relative to each other by sliding the one clamp carrying the hinge plate 60 with respect to the other clamp carrying the hinge plate 57 on the hinge pin 59 until the lug 62 on the opposite end of the hinge plate 60 engages the opposite side of the central lug 58 fixed to the hinge plate 57. Because the resulting increased angle of the cords is necessarily accompanied by a change of the distance between the clamping members, the shifting movement is accompanied by a simultaneous relative rotation of the clamps with respect to each other about the hinge pin 59. Initially, the fabric is placed in the jig 42 with the clamping members 46 disposed at an angle to each other, as indicated in Fig. 10. For the purpose of softening the rubber of the fabric to permit the necessary relative shifting movement of adjacent cords of the fabric with respect to each other, the jig is placed, at the start of this operation, on the upper surface of a heater 65 provided with an internal chamber 66, through which a suitable heating medium may be circulated through suitable inlets and outlets (not shown). After the rubber on the fabric has been softened by application of heat for a brief period of time, e. g., after 15 seconds, the clamping members 46 are rotated about the hinge pins 59 so that the longitudinal blocks 48 are flush with the top of the heater 65. This applies tension on the center portion of the fabric 43 causing the cords to shift to a higher angle. Immediately thereafter, the jig 42 is removed from the heater 65 and the fabric is allowed to cool in the shifted position.

After increasing the angle of the cords at the center zone 43 of the fabric and after removing the fabric from the shifting jig 42, the fabric has the appearance shown in Fig. 11. In this fabric the cord at the outer zones 44 has essentially the same angle as it had originally, e. g., typically 50° to 60°, while the inner zone 43 has a relatively increased cord angle, e. g., typically 65° to 75°. Because the central zone of the fabric has a higher angle than the outer zones, this fabric is termed a dual angle fabric. This improved fabric is employed to prepare a pneumatic tire as described previously. The tire so produced has the unique and highly desirable cord path indicated by curve C in Fig. 6, that is, the carcass cords in the shaped tire have a high crown angle. This is in contrast to the conventional cord path A, wherein the cord angle is at a minimum at the crown of the tire. The essential characteristic of the type of cord path represented by curve C is that the angle at the crown is a maximum value compared to the angle of adjacent portions at either side of the crown. In all cases such an improved cord path will result from the cord fabric so that a smoother ride is obtained. On the other hand, angle at its center zone than at its marginal zones.

From the foregoing it is evident that the invention provides a tire in which the cords or other carcass reinforcing elements are disposed along a most advantageous path. Since the cords follow a geodesic path from one side of the tire to the other, or an approximately geodesic path, and since a geodesic path is the shortest path across the carcass on a bias, the invention results in appreciable economy in the amount of tire cord incorporated in the tire.

Because the cord angle is high at the crown of the tire, the carcass reinforcing elements are enabled to exert a greater resistance to rupturing of the tire, and they also prevent undue extension of the rubber in the bases of the tread grooves, thereby substantially reducing groove cracking. At the same time, the high crown angle results in a greater deflection of the tire for a given load, and the tire yields or gives more readily against obstacles, so that a smoother ride is obtained. On the other hand, the lower angle produced at the side wall and bead of the tire in the preferred form of the invention gives rise to superior handling characteristics and more responsive steering. Such a low sidewall angle is also conducive to decreased fabric fatigue.

It is interesting to note that it is not possible to obtain, with conventional cord fabric having the cords running at a constant angle, a tire carcass wherein the crown angle is higher than the angle at regions adjacent to the crown. If the cords in the tire fabric run across the fabric in a straight line, it is well recognized that in the shaped tire the crown angle will be less than the angle at the side walls. Also, it should be noted that it is not practical by conventional methods to construct a tire with a high crown angle, because if the cord angle in conventional tire fabric is sufficiently high to produce a high crown angle, then the angle in the sidewalls will be even higher, with the result that the stability of the tire will be very poor.

It should also be noted that it is not possible by conventional means to attempt to obtain the benefits of high crown angle and low side wall angle by utilizing different angles in the different plies of the tire. The geometrical requirements of the tire shaping operation are such that the tire cannot be properly shaped without wrinkling of the various plies, unless the plies have essentially the same cord angle at each corresponding point on the carcass surface.

Having thus described my invention, what I claim and desire to protect by Letters Patent is:

1. A pneumatic tire having stranded carcass reinforcing elements arranged in laminated plies extending around inextensible bead assemblies, said stranded elements in a given ply extending on a bias from one bead of the tire to the other along a generally S-shaped cord path having a minimum cord angle at the beads, and gradually increasing to a maximum cord angle at the crown of the tire, said cord angles being measured with reference to the center line of the crown of the tire.

2. A pneumatic tire having stranded carcass reinforcing elements arranged in laminated plies extending around inextensible bead assemblies, said stranded elements in a given ply extending on a bias from one bead of the tire to the other along a generally S-shaped cord path having at the beads a minimum cord angle, within the range from 30° to 40°, and having at the crown of the tire a maximum cord angle, within the range from 45° to 55°, said cord angles being measured with reference to the center line of the crown of the tire.

3. A ply of tire fabric for use in building a pneumatic tire carcass comprising stranded reinforcing elements arranged on a bias and coated with vulcanizable rubber carcass stock, said stranded elements extending across the fabric in a generally S-shaped cord path having toward the marginal edges of the fabric a minimum cord angle, and increasing to a maximum cord angle at the central zone of the fabric, said cord angles being measured with respect to the longitudinal center line of the fabric when the fabric is in the flat before being formed into tire shape.

4. A ply of tire fabric for use in building a pneumatic tire carcass comprising stranded reinforcing elements arranged on a bias and coated with vulcanizable rubber carcass stock, said stranded elements extending in a generally S-shaped cord path across the fabric, said path having toward the marginal edges of the fabric a minimum cord angle, within the range from 50° to 60°, and having at the central zone of the fabric a maximum cord angle, within the range from 65° to 75°, said cord angles being measured with respect to the longitudinal central line of the fabric when the fabric is in the flat before being formed into tire shape.

5. A ply of tire fabric for use in building a pneumatic tire carcass comprising stranded reinforcing elements arranged on a bias and coated with vulcanizable rubber carcass stock, said stranded elements extending across the fabric in a generally S-shaped cord path having toward the marginal edges of the fabric a minimum cord angle, within the range from 37° to 47°, and a progressively increasing cord angle toward the center of the fabric, said angle attaining a maximum of from 65° to 70° at the center of the fabric, said cord angles being measured with reference to the longitudinal center line of the fabric when the fabric is in the flat before being formed into tire shape.

6. A method of making a ply of tire fabric which comprises arranging stranded reinforcing elements on a bias in said ply along a cord path extending from one side of the fabric to the other in a line describing in the plane of a single ply a single S-form having a higher cord angle at the center of the fabric than at either side thereof, said cord angle being measured with respect to the longitudinal center line of the fabric when the fabric is in the flat before being formed into tire shape.

7. A method of making a ply of tire fabric which comprises disposing stranded reinforcing elements on a form having an arched surface, with the said stranded elements extending from one side arched surface of the form to the other along a line describing in the plane of a single ply a single S-form having a maximum cord angle at the central segment of the said arched form, and having a progressively lesser cord angle toward each side of the form, the said cord angles being measured with respect to the longitudinal center line of the form.

8. A method of making a ply of tire fabric which comprises providing a bias tire fabric having stranded reinforcing elements extending from one side of the fabric to the other at a constant cord angle in a single definite plane, and thereafter increasing the cord angle of the center zone of the fabric with respect to the side zones to distort the cord path of the stranded elements into a single generally S-shape in said plane, the said cord angles being measured with respect to the longitudinal center line of the fabric.

9. A method of making a ply of tire fabric which comprises providing a tire fabric having stranded reinforcing elements extending from one side of the fabric to the other on a bias at a constant cord angle in a single definite plane, the said stranded elements being embedded in vulcanizable rubber carcass stock, clamping the fabric longitudinally at spaced points on either side of a central zone thereof, heating the fabric to soften the said carcass stock to a readily deformable condition, and shifting the clamped points with respect to each other to increase the cord angle of the stranded elements in the said central zone and distort the cord path of the said stranded elements into a generally S-shape, and cooling the fabric to a shape-retaining state in the said shifted position, said cord angles being measured with respect to the longitudinal center line of the fabric.

10. A method of making a pneumatic tire having a carcass made up of a plurality of plies of stranded reinforcing elements extending from one bead of the tire to the other, including the step of disposing the stranded elements along a generally S-shaped cord path in a given carcass ply, said path having a higher cord angle at the crown of the tire than at portions at either side of the crown, said cord angle being measured with respect to the center line of the crown of the tire.

11. A method of making a pneumatic tire having a plurality of carcass plies made up of stranded reinforcing elements extending from one bead of the tire to the other, including the step of disposing the stranded elements along a generally S-shaped cord path in a given ply of the carcass, said path having a maximum cord angle at the crown of the tire and a minimum cord angle at the beads, said cord angles being measured with reference to the center line of the crown of the tire.

12. A method of making a pneumatic tire having a plurality of carcass plies made up of stranded reinforcing elements extending from one bead of the tire to the other, including the step of disposing the said stranded elements in a given ply of the tire along a generally S-shaped cord path having a cord angle within the range from 45° to 55° at the crown of the tire and a cord angle within the range from 30° to 40° at the beads of the tire, said cord angles being measured with reference to the center line of the crown of the tire.

References Cited in the file of this patent

UNITED STATES PATENTS

| Number | Name | Date |
|---|---|---|
| 1,428,040 | Kratz | Sept. 5, 1922 |
| 1,554,370 | Renner | Sept. 22, 1925 |
| 1,557,329 | Respess | Oct. 13, 1925 |
| 1,603,856 | Midgley | Oct. 19, 1926 |
| 1,603,857 | Midgley | Oct. 19, 1926 |
| 2,179,374 | Kraft | Nov. 7, 1939 |
| 2,184,326 | Thomas | Dec. 26, 1939 |
| 2,451,973 | Purdy | Oct. 19, 1948 |
| 2,495,808 | Colmant | Jan. 31, 1950 |
| 2,501,644 | Kraft et al. | Mar. 21, 1950 |
| 2,546,230 | Modigliani | Mar. 27, 1951 |